Aug. 4, 1964

W. M. CAROW ETAL 3,143,719

VERTICAL SENSING ELEMENT

Filed Oct. 3, 1961

WALTER M. CAROW
JAMES W. DAVIES
INVENTORS

BY

ATTORNEYS

… … …

United States Patent Office 3,143,719
Patented Aug. 4, 1964

3,143,719
VERTICAL SENSING ELEMENT
Walter M. Carow, West Orange, and James W. Davies, Wayne, N.J., assignors to General Precision Inc., Little Falls, N.J., a corporation of Delaware
Filed Oct. 3, 1961, Ser. No. 142,619
15 Claims. (Cl. 336—30)

This invention relates to vertical sensing elements and more particularly to an electrical vertical sensing element which produces two output signals proportional to its angle of tilt about two orthogonal axes.

One common type vertical sensing element used in the past was a pendulum controlled potentiometer having an electrolyte confined in a symmetrical circular chamber. Two co-ordinate resistance paths were established through the electrolyte by two pairs of transversely disposed contact members and upon displacement of the pendulum from its normal vertical position, a voltage was produced proportional to the displacement of the pendulum and dependent upon the direction of the displacement. These electrolytic devices required complicated external electronic bridge circuits and proved to be difficult to manufacture.

The vertical sensing element of the present invention overcomes these disadvantages of the electrolytic devices by providing an essentially frictionless wire suspended pendulum which acts as the moving portion of two orthogonally mounted, reaction free, differential transformers. Since the pendulous mass is free to traverse the two axis differential transformer, two A.C. output signals are obtained each proportional to the displacement about one of the two orthogonal axes, and each having a phase indicative of the direction of displacement relative to the axis associated therewith. No magnetic reaction forces are experienced to oppose movement of the pendulum since the permeance of the transformers is maintained constant for all lateral positions of the pendulum. The differential transformers greatly simplify the manufacture of the device and by making it a reaction free, constant permeance device with an essentially frictionless wire suspended pendulum, the threshold sensitivity is greatly improved along with the linearity of the phase sensitive output signals.

Accordingly, it is one object of the invention to provide a vertical sensing element having superior threshold sensitivity and phase sensitive A.C. output signals proportional to tilt angle which exhibit exceptional linearity.

It is another object of the invention to provide a vertical sensing element having an essentially frictionless wire suspended pendulum as the moving portion of two orthogonally mounted, reaction free, differential transformers which provide phase sensitive A.C. output signals proportional to tilt angle.

It is a further object of the invention to provide a vertical sensing element which is particularly suitable for use in intially aligning a gyro platform.

It is a still further object of the invention to provide a vertical sensing element having an essentially frictionless wire suspended pendulum acting as the moving portion of two orthogonally mounted differential transformers wherein the permeance is constant for lateral traversal of the pendulum to eliminate reaction forces on the pendulum and wherein the magnetic paths of the two orthogonally mounted differential transformers are completely independent so as to provide a phase sensitive output signal proportional to tilt angle about each of the two orthogonal axes.

It is a still further object of the invention to provide a vertical sensing element of the type described above wherein the pendulum has a magnetic ring fabricated in four separated sections of magnetic permeable material which cooperate with the orthogonally mounted differential transformers in a manner to insure zero cross coupling between the magnetic paths of each of the coils of the transformers.

It is a still further object of the invention to provide a vertical sensing element having a pendulous mass supported by a frictionless wire suspension.

It is a still further object of the invention to provide a vertical sensing element having a pendulous mass acting as the moving portion of two orthogonally mounted differential transformers which is hermetically sealed and contains a fluid damping medium.

It is a still further object of the invention to provide a vertical sensing element of the type described above employing reaction free differential transformers which are not sensitive to excitation voltage and which exhibit maximum linearity.

It is a still further object of the invention to provide a vertical sensing element which is simple, compact and easily employed to assist in the initial alignment of a gyro platform.

FIG. 3 is a sectional view taken on the line 3—3 of FIG. 1; and

FIG. 4 is an enlarged, partial sectional view taken on the line 4—4 of FIG. 2.

Figure 1:
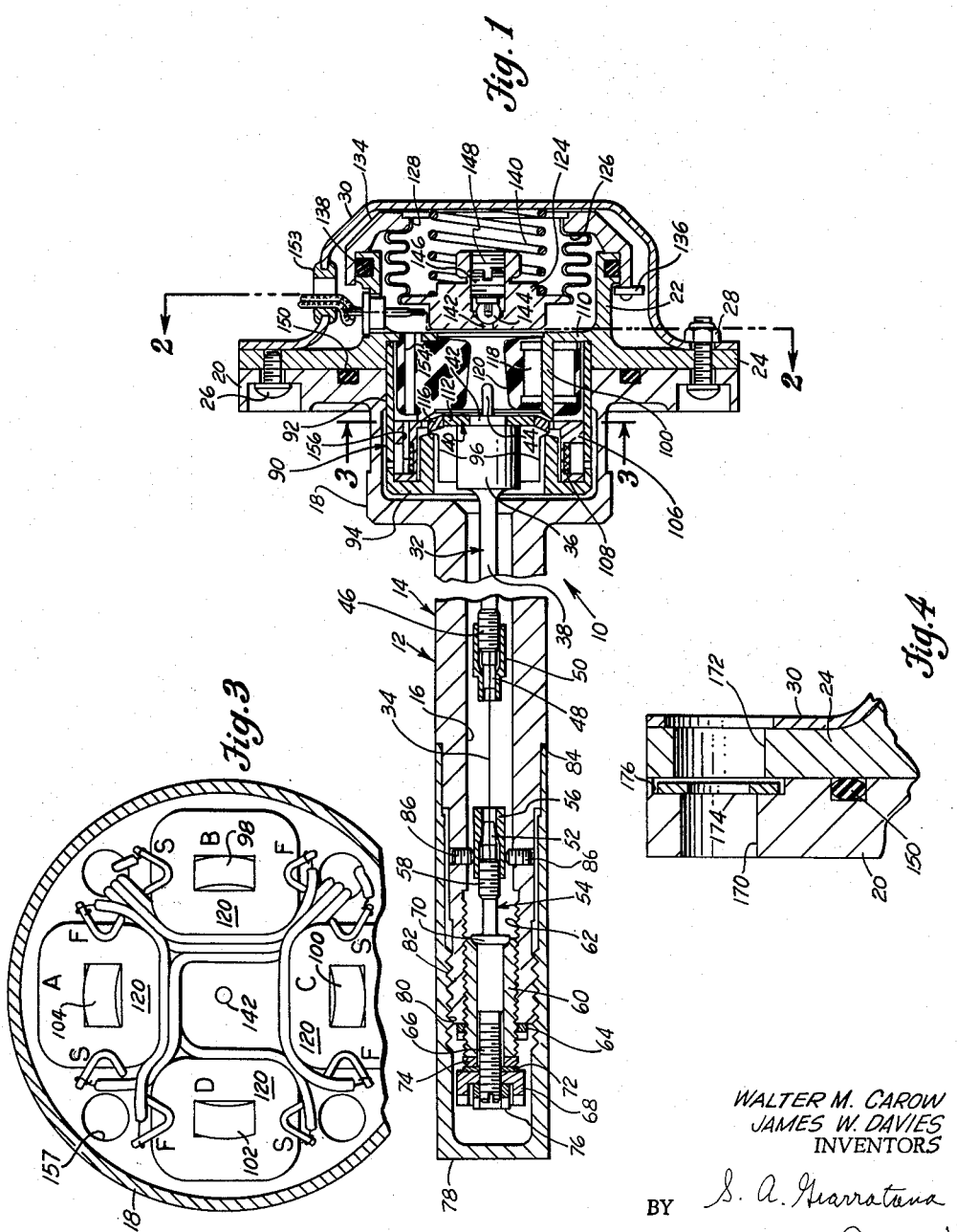
FIG. 1 is a vertical sectional view taken on the line 1—1 of FIG. 2 of a vertical sensing element embodying features of the present invention.
Figure 2:
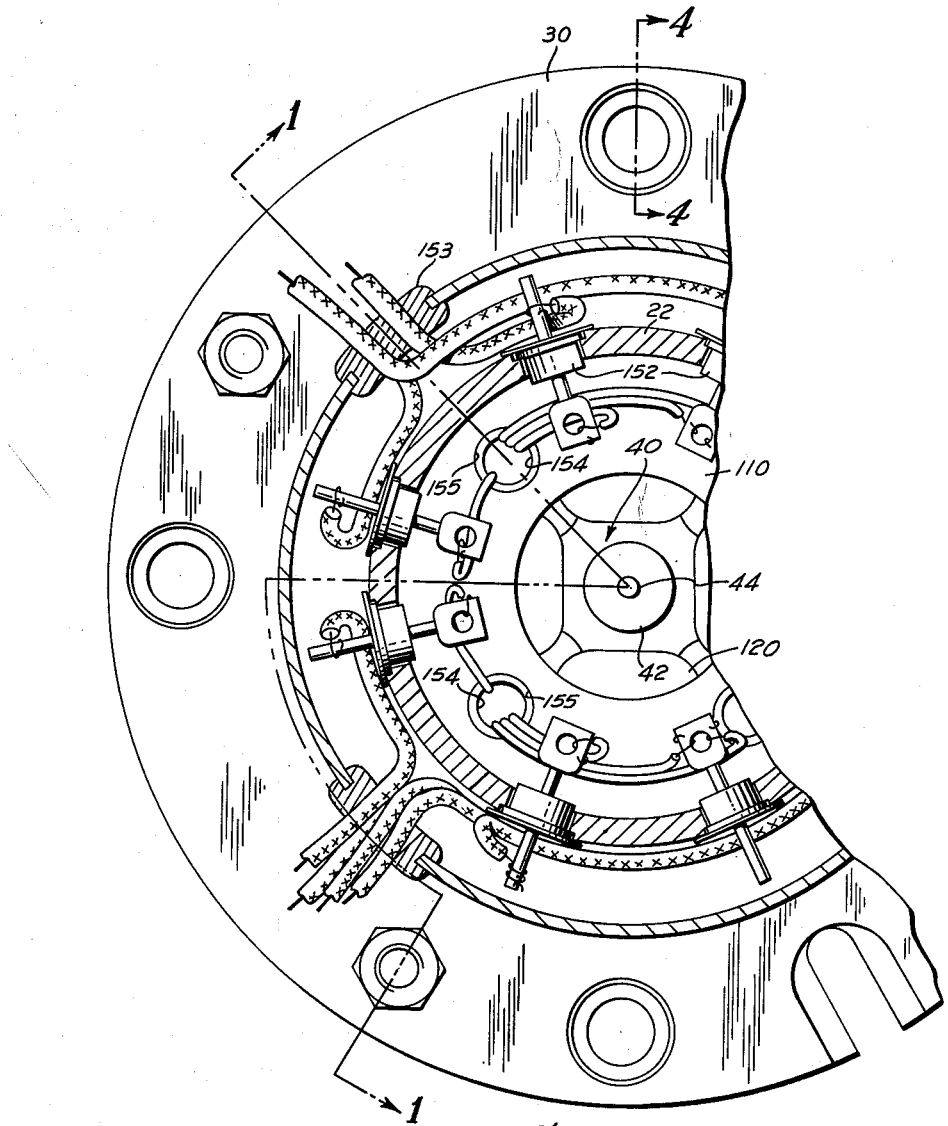
FIG. 2 is an enlarged sectional view taken on the line 2—2 of FIG. 1.

Referring to FIG. 1 a vertical sensing element 10 is illustrated which embodies features of the present invention. It comprises a housing 12 having a cylindrical portion 14 with a central passageway 16 therethrough and a cup shaped portion 18 on one end thereof having a flange 20 projecting radially from the end thereof. A cylindrical element 22 having a flange 24 projecting laterally from one end thereof is bolted to the flange 20 by a plurality of circumferentially spaced bolts 26. Some of the bolts 26 are lengthened and have nuts 28 thereon for securing a flanged end cover 30 to the flange 24 to enclose the open end of the cylindrical element 22.

A pendulum 32 is frictionlessly suspended within the housing 12 by a wire 34, as will be described in greater detail hereinafter. The pendulum 32 has a cylindrical body portion 36 freely positioned within the cup shaped portion 18 with an elongated stem 38 projecting from one end thereof and a magnetic ring 40 fixed on a boss 42 projecting from the other end thereof, a pin 44 projecting from the end face of the boss 42. The end of the stem 38 has an enlarged threaded portion 46 thereon with a longitudinally split collet 48 projecting therefrom. One end of the wire 34 is positioned within the collet 48 and a sleeve 50 is screwed on to the threaded portion 46 in a manner to engage the tapered portion of the collet to exert a radial force thereon as the sleeve is advanced axially relative to the collet to tightly clamp the end of the wire 34.

The other end of the wire 34 is similarly clamped in a collet 52 on the end of a rod 54 by a sleeve 56 screwed on to a threaded portion 58 of the rod in the same manner that the sleeve 50 is screwed on to the threaded portion 46. The rod 54 extends through an externally threaded cylindrical element 60 which is threadably engaged in an internally threaded portion 62 on the upper end of the cylindrical portion 14 of the housing 12, and a suitable castellated lock nut 64 is provided to lock the cylindrical element 60 in a given position. The end of the rod 54 projecting from the cylindrical element 60 has an externally threaded portion 66 thereon threadably engaged by a castellated nut 68 to draw an annular shoulder 70 intermediate the ends of the rod against a suitable seat on the opposite end of the cylindrical element 60. A washer 72 is provided between the castellated nut 68 and the end of the cylindrical element 60, a slotted end portion 74 on cylindrical member 60 facilitates screwing and unscrewing of the cylindrical element in the internally threaded portion 62 of the housing. If desired, another castellated locked nut 76 may be provided to lock the nut 68 on the externally threaded end of the rod 54.

With this construction the height of the pendulum 32 can be readily adjusted by loosening the appropriate lock nuts and advancing or retracting the externally threaded cylindrical element 60 by engaging a suitable tool in the slotted member 74 to rotate the cylindrical element. An end cap 78 is provided to enclose the end of the cylindrical portion 14 of the housing and may be secured in any suitable manner such as by providing it with an internally threaded portion 80 in position to threadably engage an externally threaded portion 82 on the end of the cylindrical portion 14, the end cap 78 being screwed onto the cylindrical portion until the end thereof locks against an annular shoulder 84 of the periphery of the cylindrical portion 14.

Adjustment for the axial position of the wire 34 is provided by a plurality of set screws 86 threadably mounted in the wall of the cylindrical portion 14 with the inner ends thereof engaging the sleeve 56. With this construction the set screws can be advanced or retracted radially to adjust the axial position of the sleeve 56 a small amount and thereby adjust the axial position of the wire 34 and the pendulum 32 suspended therefrom.

A magnetic core 90 is fixed in the cup shaped portion 18 of the housing 12 and comprises a cylindrical wall 92 having a radially inwardly directed flange 94 on one end thereof with four circumferentially spaced core pieces 96 projecting axially from the inner edge of the flange 94. The core pieces 96 have an arcuate cross section similar to the cross section of core pieces 98, 100, 102 and 104, as illustrated in FIG. 3 and which will be referred to in greater detail hereinafter. A ring 106 having a channel shaped cross section is fitted over the core pieces 96 and has an exciting coil 108 wound thereabout to magnetize each of the core pieces when energized. The cylindrical element 22 is also made of magnetic permeable material and is provided with a radially inwardly directed flange 110, the core pieces 98, 100, 102, 104 being formed integral therewith and projecting upwardly from the edge thereof in alignment with each of the core pieces 96 to define an air gap therebetween.

The magnetic ring 40 comprises a body portion 112 of suitable non-magnetic material having separate pieces 116 of suitable magnetic permeable material projecting at an angle therefrom in position to project an equal distance into each of the air gaps when the pendulum is in the zero position as illustrated. By fabricating the magnetic ring in this manner with four discrete, separated pieces 116 the magnetic paths between each pair of core pieces defining an air gap are completely independent with zero cross coupling. A pick-up coil 118 is wound about each of the core pieces 98–104 with diametrically opposed coils connected together in series and wound in opposite directions to provide two orthogonal differential transformers, each of the pick-up coils 118 being encased in a body 120 of suitable electrical insulating material.

With this construction the coil 108 can be energized by a suitable A.C. source and the two orthogonally mounted differential transformers will provide two A.C. output signals proportional to the tilt of the vertical sensing element about each orthogonal axis. Further, each of the output signals will be either in phase with the A.C. source or 180° out of phase therewith dependent upon the direction of lateral displacement of the magnetic ring relative to the orthogonal axes.

In accordance with an important feature of the present invention, the permeance of the transformer is constant for lateral traversal of the pendulum within the limits defined by the annular shoulder 122 projecting radially inwardly from the channel shaped ring 106 in position to surround the four air gaps and limit the lateral displacement of the pendulum. Since the permeance of the transformer is constant, the total flux across the four air gaps remains constant for all lateral positions of the pendulum and, consequently, there are no magnetic reaction forces tending to oppose the movement of the pendulum. The constant permeance feature is obtained by virtue of the geometry of the magnetic ring 40 and the core pieces defining the air gap. In this connection it will be observed that the pole faces of the core pieces 96 and 98, 100, 102, 104 are beveled and offset as illustrated and the separate magnetic permeable pieces 116 of the magnetic ring 40 project an equal distance into each of the air gaps in the vertical position as illustrated. The pieces 116 are also disposed at an angle so as to maintain a predetermined relationship with the beveled pole faces for all lateral positions of the pendulum.

The entire housing 12 is filled with a suitable fluid for damping the movement of the pendulum and resisting damage from shock or vibration. The annular shoulder 70 cooperates with the seat on the end of the externally threaded cylindrical element 60 to prevent the fluid escaping at one end of the housing and an expanding piston 124 and bellows 126 are provided at the other end to form an enclosed chamber for the fluid in a manner to accommodate volumetric changes in the fluid in response to temperature changes. One end of the bellows 126 is sealed to the periphery of the piston 124 and the other end is sealed to the edge of an aperture 128 in a ring 134 fitted over the end of the cylindrical element 22 and suitably secured against removal therefrom such as by a lock pin 136, a precision O-ring 138 being positioned between the cylindrical element 22 and the ring 134 for sealing purposes. A spring 140 is interposed between the piston 124 and the end cover 30 to maintain a small pressure on the fluid at all times and so enable the piston to move to accommodate changes in the volume of the fluid caused by temperature changes. Fluid can be introduced into the housing through an orifice 142 in the piston 124 which is sealed off by a ball shaped valve 144 fixed on the end of a set screw 146 threadably engaged in an internally threaded bore 148 in the plug 124. A precision O-ring 150 may also be positioned between the flanges 20 and 24 to provide a seal therebetween.

Suitable feed through terminals 152 are circumferentially fixed in the wall of the cylindrical element 22 and reinforcing rings 153 are fixed in the wall of the cover 30 in alignment therewith to facilitate external electrical connection to the four coils 118 and their exciting coil 108. A passageway 154 is formed in the electric insulating bodies 120 aligned with apertures 155 and 156 formed in the channel shaped ring 106 and flange 110, respectively, to facilitate the electrical connection to the exciting coil 108. Additional apertures 157 are provided in the flange 110 between the insulating bodies to facilitate electrical connection to the coils 118. In order to facilitate the mounting of the vertical sensing element 10 on a gyro platform to be aligned, the flanges 20 and 24 are provided with a plurality of circumferentially spaced aligned bolt holes 170 and 172, a pair of which are illustrated in FIG. 4. A washer 174 is locked in a counterbore 176 in the end of each of holes 170 to aid the connection.

From the foregoing it will be apparent that the present invention provides a highly accurate, two axis, electrical plumb bob wherein the essentially frictionless wire suspended pendulum acts as the moving portion of the two orthogonally mounted differential transformers which provide phase sensitive A.C. output signals proportional to the tilt angle about each of the two orthogonal axes. No reaction forces are experienced since the permeance of the transformer is constant and by fabricating the magnetic ring 40 of the pendulum in four discrete sections of magnetic permeable pieces 116, the magnetic paths associated with each of the four coils 118 are completely independent from one another to insure zero cross coupling. The device is relatively simple to fabricate compared to prior art instruments and no complex cumbersome external electronic networks are required.

What is claimed is:

1. A vertical sensing element comprising a housing, two orthogonally mounted differential transformers positioned within said housing, and a wire suspended freely movable pendulum mounted within said housing, said pendulum having magnetic permeable material thereon positioned to act as the moving armature portion of the two transformers to provide two phase sensitive output signals proportional to the tilt angle of the pendulum about each of the two orthogonal axes, said differential transformers collectively having substantially constant permeance for all positions of the pendulum relative thereto whereby the total flux of the transformers remains substantially constant for all positions of the pendulum to insure that no magnetic reaction forces are exerted on the pendulum to oppose its movement.

2. The invention as defined in claim 1 wherein said housing is filled with a damping fluid to dampen the movement of the pendulum.

3. A vertical sensing element comprising four pairs of core pieces each defining an air gap therebetween and each positioned to define two orthogonal axes, exciting coil means positioned about the core pieces on one side of the air gaps, a separate pickup coil wound about each of the core pieces on the other side of the air gaps, each pair of coils on the same orthogonal axis being connected in series and wound in opposite directions about their respective core pieces, a pendulum mounted between said four coils and having portions thereof of magnetic permeable material extending into each of said air gaps to provide a movable armature that cooperates with the core pieces and coils in a manner to form two differential transformers, said transformers collectively having a constant permeance for all positions of the pendulum whereby the total flux across the air gaps is constant for all positions of the pendulum to insure that magnetic reaction forces are not exerted on the pendulum to oppose the movement thereof.

4. The invention as defined in claim 3 wherein each of said portions of the pendulum are magnetically isolated from one another.

5. The invention as defined in claim 4 wherein said pendulum is supported by a wire to make its movement substantially frictionless.

6. A vertical sensing element comprising a housing, a first member of magnetic permeable material in said housing having four core pieces projecting therefrom in parallel spaced relation and positioned to define two orthogonal axes, exciting coil means wound about said four core pieces, a second member of magnetic permeable material having four core pieces projecting therefrom into said housing in alignment with the core pieces of said first member to define four air gaps, a pickup coil wound about each of the core pieces of said second member, each pair of pickup coils on the same orthogonal axis being connected together in series and wound about their respective core pieces in opposite directions to form two orthogonally mounted differential transformers, a pendulum mounted within said housing for free movement relative thereto, said pendulum having magnetic permeable material thereon in position to project into each of said air gaps to act as a movable armature for the two differential transformers, said transformers having a constant permeance for all lateral positions of the pendulum relative thereto whereby the total flux of the transformers remains constant for all positions of the pendulum to insure that magnetic reaction forces are not exerted on the pendulum to oppose the movement thereof.

7. The invention as defined in claim 6 wherein said pendulum is suspended by a wire to provide substantially frictionless movement thereof.

8. The invention as defined in claim 7 wherein said housing is filled with a fluid to dampen the movement of the pendulum.

9. A vertical sensing element comprising a housing, a first member of magnetic permeable material positioned within said housing having four core pieces projecting therefrom in parallel spaced relation and positioned to define two orthogonal axes, a single exciting coil wound about said four core pieces, a second member having four core pieces of magnetic permeable material projecting into said housing in alignment with the core pieces of said first member to define four air gaps, a separate pickup coil wound about each of the core pieces of said second member, an adjacent pair of pickup coils being wound in one direction about their core pieces and the other adjacent pair of pickup coils being wound in the opposite direction about their core pieces, means for connecting one coil from each adjacent pair of coils together in series to provide two orthogonally mounted differential transformers, a pendulum freely supported in said housing and having four discrete pieces of magnetic permeable material thereon magnetically isolated from one another, each of said pieces projecting into one of said air gaps, said transformers having a constant permeance for all positions of the pendulum whereby the total flux of the transformers remains constant for all positions of the pendulum to insure that no magnetic reaction forces are imposed upon the pendulum to oppose the movement thereof.

10. A vertical sensing element comprising a housing having a cylindrical portion with a central passageway therethrough and an enlarged cup shaped portion on one end thereof, a first member of magnetic permeable material positioned within said cup shaped portion and having four core pieces projecting therefrom parallel to the axis of said central passageway and positioned to define two orthogonal axes, a second member of magnetic permeable material having four core pieces projecting therefrom into said housing in alignment with the core pieces of said first member to define four air gaps, a single exciting coil wound about said core pieces of said first member, a separate pickup coil wound about each of the core pieces of said second member, each pair of pickup coils defining on the same orthogonal axis being connected together in series and wound in the opposite direction about their respective core pieces to form two orthogonally mounted differential transformers, a pendulum positioned within said cup shaped portion and having a stem extending into said central passageway, a wire in said central passageway having one end thereof connected to the end of said stem, means on said cylindrical portion of the housing connected to the other end of said wire to support said pendulum for free swinging movement in said cup shaped portion, a magnetic ring on said pendulum having four separate and discrete pieces of magnetic permeable material projecting therefrom, each of said pieces projecting into one of said air gaps to act as the movable armature of said differential transformers, said transformers having a constant permeance for all positions of the pendulum whereby the total flux of the transformers is constant for all positions of the pendulum to insure that no magnetic reaction forces are imposed on the pendulum to oppose the movement thereof.

11. The invention as defined in claim 10 wherein said means connected to the other end of said wire includes a first means for adjusting the vertical height of the pendulum and a second means for adjusting the axial position of the pendulum.

12. The invention as defined in claim 10 including means for closing off the end of said cup shaped portion to enclose said differential transformers, and damping fluid within said housing to dampen the movement of said pendulum.

13. The invention as defined in claim 12 including piston and bellow means within said housing for accommodating variation in the volume of said fluid caused by temperature changes.

14. The invention as defined in claim 13 wherein an aperture is formed in said housing beneath said differential transformers, and wherein said piston and bellow means comprise a piston within said housing resiliently supported above said aperture, and a bellows connected between the periphery of said piston and the edge of said aperture.

15. The invention as defined in claim 14 wherein said piston has an orifice therein communicating with the interior of the housing, and a valve removably mounted thereon in position to close off the orifice.

References Cited in the file of this patent
UNITED STATES PATENTS

| | | |
|---|---|---|
| 2,232,360 | Barnett | Feb. 18, 1941 |
| 2,552,722 | King | May 15, 1951 |
| 2,659,065 | Cordell | Nov. 10, 1953 |
| 2,683,596 | Morrow et al. | July 13, 1954 |
| 2,737,624 | Muller | Mar. 6, 1956 |
| 2,990,527 | Brown et al. | June 27, 1961 |
| 3,023,626 | Bonnell | Mar. 6, 1962 |